(12) United States Patent  
Miyake

(10) Patent No.: US 6,542,524 B2
(45) Date of Patent: Apr. 1, 2003

(54) MULTIWAVELENGTH LASER FOR ILLUMINATION OF PHOTO-DYNAMIC THERAPY DRUGS

(76) Inventor: Charles Miyake, 6416 - 106th Ave., Kirkland, WA (US) 98033

( * ) Notice: Subject to any disclaimer, the term of this patent is extended or adjusted under 35 U.S.C. 154(b) by 0 days.

(21) Appl. No.: 09/795,650

(22) Filed: Feb. 27, 2001

(65) Prior Publication Data

US 2001/0033595 A1 Oct. 25, 2001

Related U.S. Application Data

(60) Provisional application No. 60/186,921, filed on Mar. 3, 2000.

(51) Int. Cl.[7] .............................. H01S 3/10; H01S 3/20
(52) U.S. Cl. .......................................... 372/23; 372/53
(58) Field of Search .............................. 372/23, 39, 41, 372/42, 53, 69, 70, 75; 607/88; 514/410

(56) References Cited

U.S. PATENT DOCUMENTS

| 5,329,540 A | | 7/1994 | Lee et al. ....................... 372/53 |
| 5,610,932 A | * | 3/1997 | Kessler et al. ................. 372/39 |
| 5,805,623 A | * | 9/1998 | Utano et al. ................... 372/23 |
| 5,807,881 A | * | 9/1998 | Leong et al. ................. 514/410 |
| 5,851,225 A | * | 12/1998 | Lawandy ...................... 607/88 |

FOREIGN PATENT DOCUMENTS

WO    WO-99/49543    *  9/1999   .............. H01S/3/16

OTHER PUBLICATIONS

A. Costela, F. Florido, I. Garcia–Moreno, R. Duchowicz, F. Amat–Guerri, J. M. Figuera and R. Sastre; "Solid–state dye lasers based on copolymers of 2–hydroxyethyl methacrylate and methyl methacrylate doped with rhodamine 6G;" Applied Physics B 60, 383–389 (1995) (no month available).

S. Giffin, I. McKinnie, W. Wadsworth, A. Woolhouse, G. Smith, T. Haskell; "Solid state dye lasers based on 2–hydroxyethyl methacrylate and methyl methacrylate co–polymers;" Optics Communications 161 (1999) 163–170) Mar. 1999.

Iris Medical web site; http://www.irismedical.com/product.html; Product Overview of OcuLight® GL Family and OcuLight SL Family; Jun. 23, 1999.

630 PDT Module Tunable Laser System Lighting the Way in Photodynamic Therapy to Empower a Dynamic New Cancer Treatment; http://www.laserscope.com/products/laser.htm; Jul. 20, 1999.

hgm web site; http://www.hgmmedical.com/atlas.html; Medical Laser With Solid State Diode–Pumped 532nm Technology; Jun. 24, 1999.

Photodynamic Therapy web site; http://www.diomed–lasers.com/prodspec.htm; Diomed 630 PDT; Jul. 20, 1999.

Harry H.L. Wang and Leonard Gampel; "A Simple, Efficient Plastic Dye Laser;" Optics Communications vol. 18, No. 4, Sep. 1976 pp. 444–446.

Alexander Bank, Dmitry Donskoy, Vladimir Nechitailo;"High Average Power Quasi–CW Tunable Polymer Laser;" PolyOptics Ltd, Nahal–Soreq, Yavne 81800, Israel; SPIE vol. 2380 1995(no month) pp. 292–297.

* cited by examiner

Primary Examiner—Quyen Leung
(74) Attorney, Agent, or Firm—Bingham McCutchen, LLP; David G. Beck

(57) ABSTRACT

An apparatus and method are provided for converting a pump laser beam having a first wavelength to an output beam of a second wavelength. The wavelength conversion device includes a solid medium impregnated with dye laser which is rotated at a speed which is slow enough to allow the dye material to lase and fast enough to reduce thermally induced optical aberrations and triplet state absorption. The medium and method provide a variety of output laser wavelengths suitable for treating diseases of the eye. In the preferred embodiment, the medium has the dimensions of a standard compact disk.

32 Claims, 17 Drawing Sheets

MULTIWAVELENGTH LASER FOR ILLUMINATION OF PHOTO-DYNAMIC THERAPY DRUGS

CROSS-REFERENCES TO RELATED APPLICATIONS

This application claims priority of provisional patent application Serial No. 60/186,921 filed Mar. 3, 2000, the disclosure of which is incorporated herein by reference for all purposes.

FIELD OF THE INVENTION

The invention relates generally to the field of solid state lasers and more specifically to improved methods and devices for converting a pump laser beam to an output beam of a desired wavelength.

BACKGROUND OF THE INVENTION

A wavelength conversion device enables standard single wavelength lasers to perform multiple functions. One application of a wavelength conversion device is to use a common medical laser as a pump laser and to produce output wavelengths in the 570–850 nm range. Such a device can be used to facilitate a variety of medical therapies, such as in ophthalmology for retinal photocoagulation, illumination of photodynamic therapy ("PDT") drugs for the treatment of Age Related Macular Degeneration ("AMD") and other disorders, and transpupilary thermo therapy ("TTT").

When a laser is used to treat diseases of the eye, the laser's power and output wavelength(s) need to be carefully controlled. The wavelength of a laser must be matched to the absorption of a particular PDT drug to stimulate its effect. Ophthalmic laser therapies require a variety of visible and near-infrared wavelengths, depending in part on the desired depth of beam penetration. Ophthalmic PDT treatment of AMD requires about 300 mW of continuous wave laser power.

PDT drugs are typically illuminated with semiconductor diode lasers which output beams with wavelengths in the range of 630–810 nm. A drawback to the use of semiconductor diode lasers for illumination of PDT drugs is that a given diode laser is limited in the wavelength range it can produce. Typically, a single diode laser can provide on the order of 5 nm of wavelength range. Therefore, many diode laser devices would be required to illuminate all possible PDT drugs.

Laser pumped dye lasers can readily provide tunable output beams ranging from blue-green wavelengths in the visible range to near-infrared wavelengths. Laser pumped dye lasers can also be used to create typical PDT wavelengths, but are more typically used in non-ophthalmic PDT applications where an output beam with a higher power is desired. Argon ion lasers are used to optically pump an organic dye liquid in either a continuous or a rapidly pulsed mode of operation. Ultraviolet or green solid state lasers are also used to pump liquid dye lasers, typically in a pulsed mode of operation. Due to rapid decomposition of the dye, thermal-optical effects and triplet state absorption, these dye lasers have fluid circulation systems to refresh, filter and rapidly flow the dye through the lasing area. In many cases, these organic laser dyes are dissolved in solvents, which results in operational and safety problems.

The operational problems associated with liquid dye lasers have spurred research into the development of solid state dye lasers, which can be made by impregnating a variety of materials with laser dye. A solid state laser made by impregnating laser dye into a polymer can produce an optical performance comparable to that of a liquid dye laser. (See, e.g., R. Hermes, T. Allik, S. Chandra, J. Hutchinson, *High Efficiency Pyrromethene Doped Solid State Dye Lasers*, in Appl. Phys. Lett. 63(7), p. 877 (Aug. 16, 1993).) Unfortunately, results to date show that there are significant limitations to the useful lifetime of dye impregnated solid material and severe thermal optical aberrations in the solid dye laser material. (See, e.g., T. Allik, S. Chandra, T. Robinson, J. Hutchinson, G. Sathyamoorthi and J. Boyer, *Laser Performance and Material Properties of a High Temperature Plastic Doped With Pyrromethene-$BF_2$-Dyes*, in Mat. Res. Soc. Symp. Proc. Vol. 329, p.291 (1994).)

Techniques such as moving the laser media have been used with solid state crystalline or glass lasers to reduce the average heat loading in the media, thereby reducing thermally induced optical aberrations. (See U.S. Pat. No. 4,890,289, Fiber Coupled Diode Pumped Moving Slab Laser.) The technique of fabricating the laser medium into a dye impregnated plastic rod and slowly rotating the rod has been proposed. This technique decreased the thermally induced optical aberrations at low pulse repetition rates. (S. Chandra, T. Allik, A. Floener, Compact, High Brightness, Solid State Dye Laser, in OSA Proc. on Adv. Solid-State Lasers, Vol. 24 (B.H.T. Chai and S. A. Payne, eds.), Optical Society of America, 1995.) An example of a rotating plastic-disk dye laser has been described. (A. Bank, D. Donskoy, and V. Nechitailo, High Average Power Quasi-CW Tunable Polymer Laser, in Proc. SPE Vol.2380, p. 292 (R. Scheps and M. Kokta, eds.), 1995). However, none of the foregoing examples has achieved more than limited success.

SUMMARY OF THE INVENTION

According to one embodiment of the present invention, an apparatus converts a pumping wavelength of a pump laser beam to a desired output wavelength. This apparatus includes: a solid medium impregnated with at least one type of laser dye; an input optical coating disposed on a first surface of the medium; and an output optical coating disposed on a second surface of the medium. The input optical coating and the output optical coating are configured to form an optical resonator within the solid medium. The output optical coating is partially reflective at the desired output wavelength and highly reflective at the pumping wavelength.

According to a second embodiment of the present invention, another apparatus converts a pumping wavelength of a pump laser beam to a desired output wavelength. The apparatus includes: a rotating device for rotating a disk-shaped solid medium impregnated with at least one type of laser dye; a resonator to resonate light from a pumped volume of the medium; a first optical coupling device for coupling a pump laser beam having a pumping wavelength to the medium; and a second optical coupling device for coupling a laser beam output from the pumped volume of the medium to an output device. The output laser beam has a wavelength different from the pumping frequency. Preferably, the rotating device rotates the medium at a rate fast enough to clear a volume of the medium heated by the pump laser beam in about 1 $\mu$sec.

An input optical coating may be disposed on a first surface of the medium and an output optical coating maybe disposed on a second surface of the medium. The input optical coating and the output optical coating are configured to form an optical resonator within the solid medium. The input optical coating is transmissive (preferably with R<30%) at the pump wavelength and highly reflective (preferably with R>98%) at the desired output wavelength. The output optical coating is partially reflective (typically 90–99%) at the desired output wavelength and may be reflective (for example, with R>90%) at the pumping wavelength to enhance pump absorption.

If optical coatings are not disposed on the medium to form a resonator and external mirrors are used, antireflective coatings may be disposed on the medium.

The medium may be of any convenient shape, but in the preferred embodiment the medium is disk-shaped and has dimensions which approximate those of a conventional compact disk: about 120 mm in diameter and 1.2 mm thick. This allows the disk to be used in combination with many components of a conventional compact disk player, such as the platter, drive motor and disk changer. If the disk is made of plastic (for example, of dye-impregnated polymer), CD manufacturing molds and processes may be used. The ability to use existing components and manufacturing processes greatly reduces the manufacturing cost of the apparatus.

If the medium is larger than a conventional CD, it may be used for a longer time. Therefore, for some applications it is advantageous to form the medium into a size larger than that of a CD, despite the loss of some efficiencies associated with using a standard CD size.

In one embodiment, the device uses a modified version of the tracking servo found in a conventional compact disk player to move the pump laser beam in a radial direction while the disk is rotating. The tracking servo causes the pump laser beam to trace a spiral pattern on the disk.

Another embodiment causes a spiral pattern to be traced on the disk by moving the rotating disk laterally while the pump laser is fixed. This embodiment is advantageous if the input coupling device and the output coupling device are positioned on opposing sides of the medium.

In yet another embodiment, the medium is kept in a fixed position and the pump laser beam is moved to sweep the pump laser beam across the medium. A modified version of a scanning device, for example, can be used to actuate the pump laser beam. For this embodiment, the medium is preferably rectangular in shape, but may be formed into any convenient shape.

The solid medium can be impregnated with a plurality of laser dyes and can therefore emit laser light at a plurality of wavelengths. As described in more detail below, a user may choose to output a plurality of wavelengths, e.g., to simultaneously illuminate a "cocktail" of various PDT drugs. Alternatively, a user may isolate a particular wavelength which corresponds with, for example, a particular PDT drug or a particular type of laser therapy. A single medium may include a variety of optical coatings on different areas and each coating may correspond with an output wavelength. Multiple dyes can also be used when the output wavelength is very different from the pump wavelength. In this case, multiple dyes with overlapping emission and absorption wavelengths enable efficient stepwise transfer of excitation from the pump wavelength to the output wavelength.

The present invention also encompasses methods of treating eye diseases. One such method includes the steps of: providing at least one photodynamic therapy drug to a diseased portion of an eye; rotating a solid medium which is impregnated with at least one type of laser dye; illuminating a pumped spot on the solid medium with a pump laser beam having a pumping wavelength, thereby pumping a volume of the solid medium and causing the solid medium to emit an output laser beam which comprises a first output wavelength different from the pumping wavelength; and directing the output laser beam to a first photodynamic therapy drug in the diseased portion of the eye (typically via a fiber-optic cable from the laser to a slit lamp), thereby activating a first photodynamic therapy drug.

An alternative method of treating eye diseases includes the steps of: rotating a solid medium which is impregnated with at least one type of laser dye; illuminating a pumped spot on the solid medium with a pump laser beam having a pumping wavelength, thereby pumping a volume of the solid medium and causing the solid medium to emit an output laser beam which comprises a first output wavelength different from the pumping wavelength; and directing the output laser beam to a diseased portion of an eye, for photocoagulation or subcoagulation power for stimulation of tissue, as for TTT.

According to one variant of the first method, the first output wavelength is approximately 689 nm and the first photodynamic therapy drug is verteporfin, a PDT drug sold as Visudyne™, a trademark of QLT PhotoTheraputics. The first output wavelength may be in the range of 630 nm to 810 nm. The pump laser beam may have a wavelength of approximately 520–532 nm.

According to one embodiment of the foregoing methods, the pumped spot can move in a spiral pattern on the rotating solid medium. A photodynamic therapy drug may be activated for the treatment of age-related macular degeneration. The pump laser beam may be a continuous wave laser beam having a pumping wavelength of approximately 532 nm. The pumped spot preferably moves on the solid medium such that the volume of the solid medium is refreshed approximately each $\mu$sec.

The output laser beam may be used for transpupilary thermo therapy or for retinal photocoagulation. The solid medium may be impregnated with a plurality of laser dyes and the output laser beam may comprise a plurality of output wavelengths. More than one photodynamic therapy drug may be provided to the diseased portion of the eye and more than one photodynamic therapy drug may be activated.

DESCRIPTION OF THE SPECIFIC EMBODIMENTS

Figure 1:
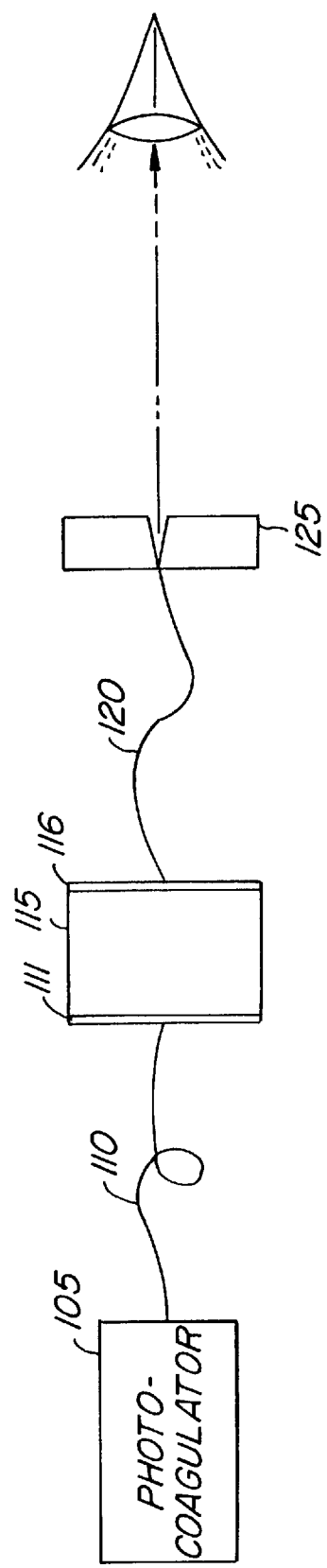
FIG. 1 is a schematic diagram of a wavelength conversion device according to the present invention.

Although the wavelength conversion device of the present invention could be used for a variety of applications, opthalmological applications have spurred the development of the present invention. Therefore, the following detailed description will focus on the use of the present invention to convert the output of "off the shelf" lasers typically used by ophthalmologists to other wavelengths useful in the treatment of eye diseases. In a preferred embodiment, the fiber optic input and output format of the wavelength conversion device is compatible with equipment commonly used by ophthalmic physicians. The dye impregnated medium can be pumped by lasers already in common use to generate laser wavelengths needed for retinal photocoagulation. According to one aspect of the present invention, a device provides a relatively inexpensive method of converting the wavelengths of existing lasers to desired laser wavelengths and power levels.

Some embodiments of the present invention are laser devices that can convert the continuous wave output from a retinal photocoagulator laser into laser wavelengths needed for illuminating PDT drugs used to treat AMD. Typical retinal photocoagulator lasers output wavelengths of 488, 514, 524, 532 or 547 nm, and PDT drugs generally require illumination in the range of 630 nm to 810 nm.

In one such embodiment, the medium is pumped by a commonly-used photocoagulator laser capable of generating 1.5–2.5 Watts average power of continuous wave blue-green laser output. The output of the photocoagulator laser and/or the output of the device may be transmitted by optical fibers, mirrors, prisms, lenses, etc., or by any convenient combination thereof. The blue-green pump laser is focused to a small spot in the medium, creating a laser gain region. The medium is preferably thin and is preferably rotated to continually expose a fresh section of the gain medium to the incident pump laser energy. The rotational and radial tracking speed is selected to be faster than the thermal time constant of the pumped region to minimize thermal effects in the gain region. The rotational and radial tracking speed must also allow the constant presentation of a "refreshed" gain medium to keep the dye triplet state absorption typically encountered in dye lasers to be minimized.

Because the laser dye in the pumped region is degraded, the disk is discarded after it has been completely used to ensure that the output performance is consistent. Preferably, the laser device in which the disk is used is programmed to recall how much of a disk has already been used and to return the pump laser to a fresh section of the gain medium the next time the device is used.

In the preferred embodiment, output wavelength(s) are encoded on the disk and read by the laser device in which the disk is used, thereby preventing accidental use of the wrong output wavelength(s).

The output from the resonator may be coupled into an output fiber. The output wavelengths can be between 630 nm and 810 nm, depending on the specific laser dye selected. These laser dyes typically have broadband emission. Optical coatings may be formed on the disk, or on a portion thereof, in order to provide some degree of wavelength selection. Such coatings can be selected to preferentially resonate at a desired wavelength. A wavelength selection device such as a diffraction grating or prism may also be provided, preferably forming part of the resonator. Such a wavelength selection device could be disposed at a fixed angle or could be rotated according to a user's selection. The dye(s) and the optical coatings may be selected to generate the proper output wavelength(s) to activate the PDT drug(s) to be illuminated. This enables a dye-impregnated medium fabricated from inexpensive polymer, for example, to be used as a wavelength conversion device tailored to the absorption characteristics of individual PDT drugs.

FIG. 1 shows a block diagram of one embodiment of a wavelength converter according to the present invention. As shown in FIG. 1, the device is connected to pump laser 105, in this example a 532 nm green photocoagulator laser, that can provide about 1.5–2.5 W of laser output through fiber 110. A typical output fiber has a core diameter of 50 μm and a numerical aperture ("NA") in the range of 0.22 to 0.37. The output of a photocoagulator laser may be continuous or gated and typically has a peak power of less than 10 W. Wavelength converter 115 is a second laser that is optically pumped by pump laser 105. In this example, wavelength converter 115 is a solid, dye-impregnated polymer which includes optical coatings to form a resonator with an output wavelength of 689 nm. The output from wavelength converter 115 is coupled into fiber 120 for delivery to ophthalmic slit lamp 125. Slit lamp 125 provides a targeting and focusing mechanism to adjust the spot size of the output laser beam onto the retina. In this example, the laser radiation on the retina is used to illuminate verteporfin, a PDT drug sold as Visudyne™, a trademark of QLT PhotoTheraputics.

Figure 2:
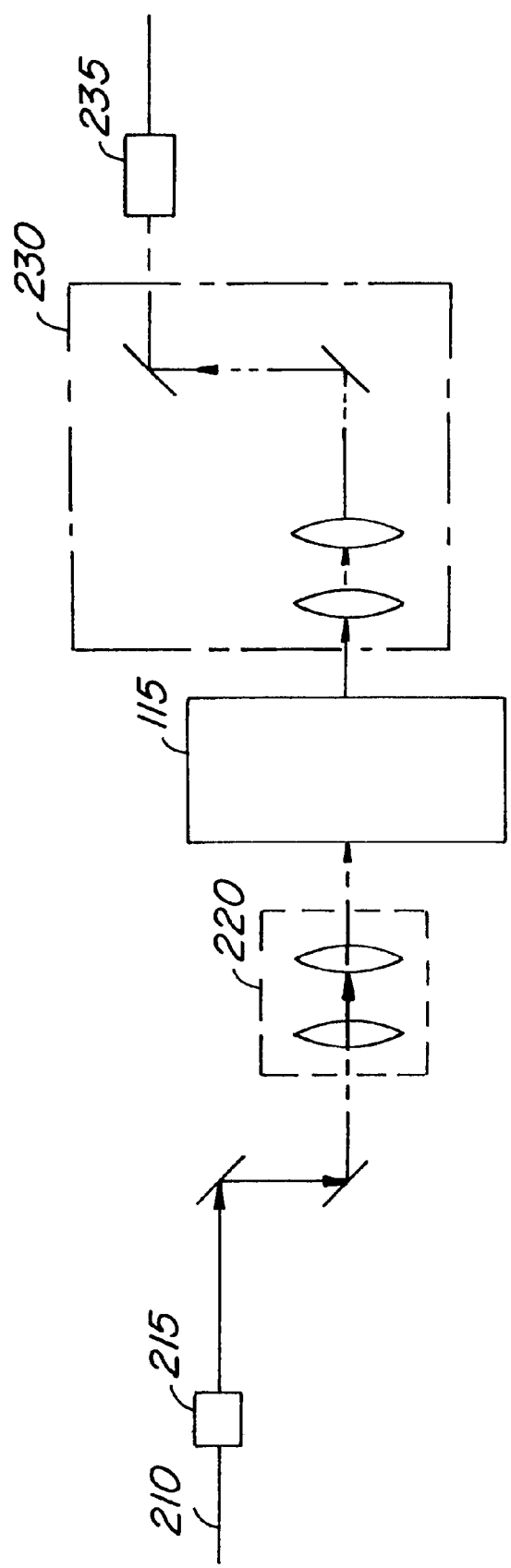
FIG. 2 illustrates some of the optical devices used for transmitting light to and from the wavelength conversion device of the present invention.

FIG. 2 illustrates one way the output from pump laser 105 may be focused to a small spot on wavelength converter 115. In this example, pump laser 105 is the type discussed with respect to FIG. 1 and outputs a 532 nm beam via input fiber 210 and fiber connector 215. Focusing mechanism 220 focuses this pump laser beam to about 100 kW/cm$^2$ pump irradiance in order to achieve efficient lasing in wavelength converter 115. Focusing mechanism 220 may be a microscope objective or any suitable optical mechanism for converging light rays. The optical components of focusing mechanism 220 may include mirrors, glass lenses, plastic lenses and/or holographic lenses.

If an optical fiber is used to deliver the pump beam, the numerical aperture (typically in the range of 0.22–0.37) and the small core diameter (typically about 50 μm) of fiber 210 require the use of low f-number optics (typically less than 1) to focus the 532 nm light into the small spot needed, which is on the order of 10–20 μm in diameter. This results in highly converging ray angles from the optics of focusing mechanism 220 and may require that the active region of wavelength converter 115 be made thin and highly absorptive, such that the diameter of the pumped spot may be made small and reasonably uniform throughout the active region of the disk. This issue will be discussed in more detail below, with reference to FIGS. 15 and 16.

Output coupling device 230 gathers the laser light emitted from wavelength converter 115 and transmits this light to fiber connector 235. The lenses and mirrors indicated in this diagram of output coupling device 230 are merely representative; one skilled in the art will readily understand that any suitable combination of optical components may be used to direct the output laser beam from wavelength converter 115.

Figure 3:
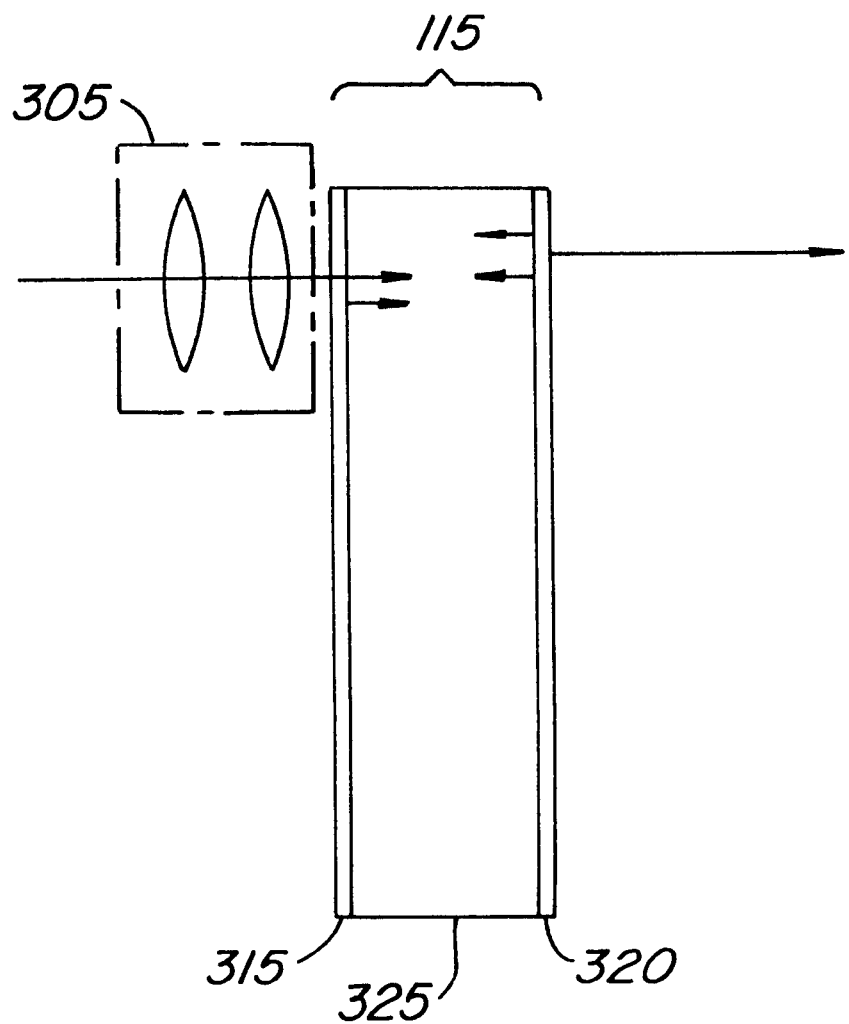
FIG. 3 is a cross-section of one embodiment of a wavelength conversion device according to the present invention.

FIG. 3 illustrates an embodiment in which the optical resonator of wavelength converter 115 is made up of optical coatings deposited directly on medium 325. This enables focusing mechanism 305, which acts as the input coupling optic for the resonator, to be located very close to wavelength converter 115. Such coatings are important because they allow the reflective elements to be tailored to the specific dye(s) used in wavelength converter 115, rather than using the same reflective elements for all dyes.

Coating 315 is preferably highly transmissive at the wavelength of pump laser 105 (here, 532 nm) and highly reflective of the output wavelength. A second surface of medium 325 has an optical coating 320, different from optical coating 315, which functions as the output coupling optical surface. Output coating 320 is highly reflective at the wavelength of pump laser 105, thereby redirecting the unabsorbed 532 nm radiation back into medium 325. The coating is partially reflective at a desired output wavelength (here, 689 nm), in order to function as an optical resonator for the desired output wavelength. In the preferred embodiment, the bandwidth of these coatings is controlled to increase losses at wavelengths other than the desired output wavelength. The output from wavelength converter 115 is collected and directed into an output optical fiber for transport to, e.g., a slit lamp.

Figure 4:
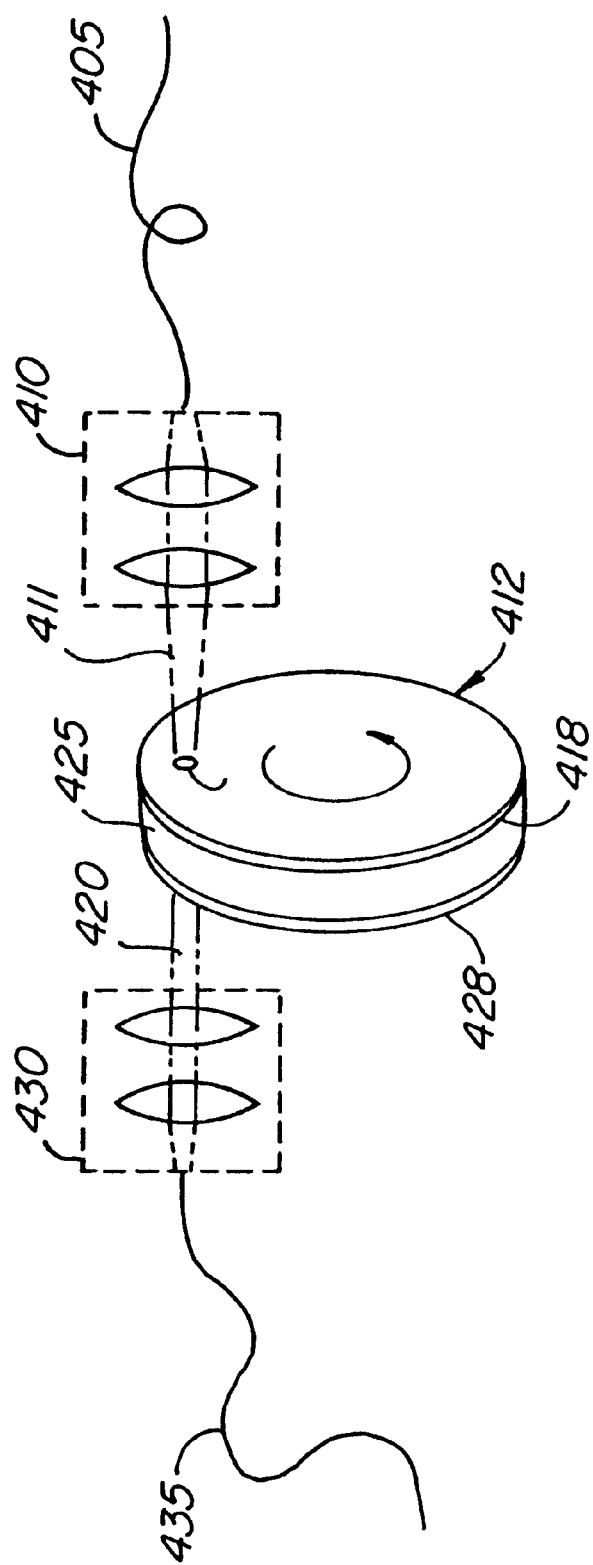
FIG. 4 illustrates a disk-shaped embodiment of the wavelength conversion device of the present invention.

As illustrated in FIG. 4, medium 425 is preferably formed into the shape of a disk. Here, optical coating 418 is disposed on one side of disk 412 and optical coating 428 is disposed on the opposing side of disk 412. In the preferred embodiment, disk 412 is rotated at a rate faster than the thermal time constant of gain region 415, the volume of material heated by pump beam 411. The rotational speed should also be fast enough to minimize absorption by triplet dye molecules formed when the dye is excited. In the embodiment depicted in FIG. 4, the pump laser beam is transmitted from a pump laser via optical fiber 405 and focused on disk 412 by pump input 410. Disk 412 emits output beam 420, which is coupled to output optical fiber 435 by optical coupler 430.

In the preferred embodiment, the rotational speed of the spinning disk is selected such that the gain region, which typically has a diameter of 10–20 $\mu$m, is fully cleared in about 1 $\mu$sec. The rotational speed is selected to be fast enough to clear the pumped volume to control the optical losses associated with triplet state absorption typically encountered in laser dyes. The preferred range of corresponding linear speeds for gain regions with diameters of 10–20 $\mu$m is roughly 10 m/s to 20 m/s. However, the preferred velocity varies according to the diameter of the gain region.

Gain region 415 is preferably moved in a radial direction in order to cause gain region 415 to move through disk 412 in a spiral pattern. The radial motion is selected to be sufficiently fast to ensure that the spiral has enough spacing between tracks such that the thermal diffusion from gain region 415 does not significantly heat the adjacent track. By spinning disk 412 and moving gain region 415 radially, thermal optical effects can be controlled.

Figure 5:
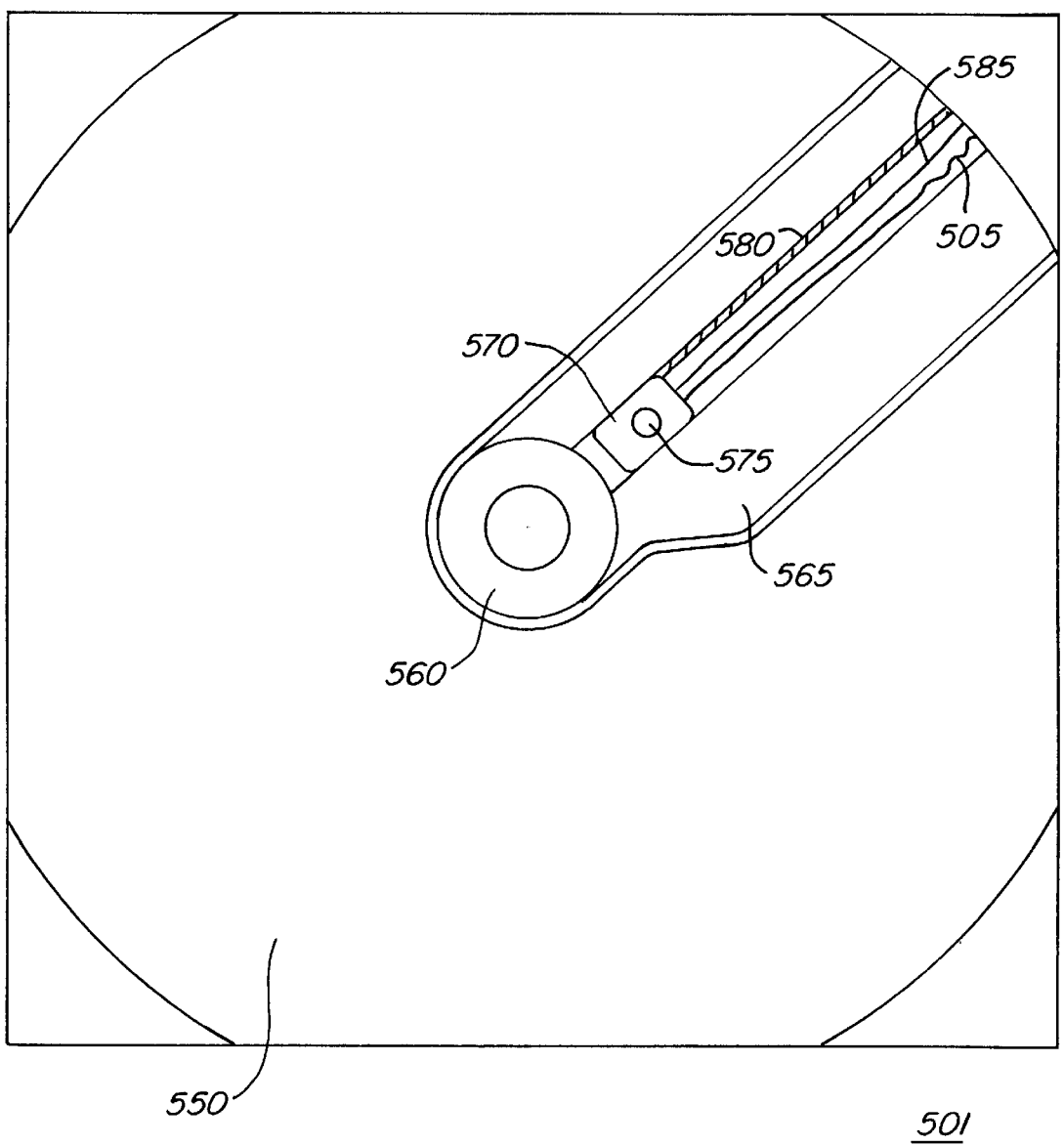
FIG. 5 is a schematic diagram of one embodiment of a laser apparatus according to the present invention.

Referring now to FIG. 5, an embodiment of laser apparatus 501 for rotating disk 630 (not shown on FIG. 5; see FIG. 6) and for moving gain region 415 in a spiral pattern. Disk 630 may or may not include an optical resonator made up of optical coatings deposited directly on medium 325.

Preferably, the output wavelengths of disk 530 are encoded on the disk and are read by laser apparatus 501, thereby preventing accidental use of the wrong output wavelength. In the preferred embodiments, such encoding is formed by the pits and lands used in conventional compact disk recording and is preferably read by an optical pickup used in a conventional compact disk player. However, the encoding can be formed and read in any convenient fashion. For example, the output wavelengths could be recorded on a bar code or a magnetic strip.

FIG. 5 illustrates an embodiment of disk tray 550 of laser apparatus 501, in which optical device 570 is disposed in recessed area 565. Here, turntable 560 protrudes above recessed area 565 and supports disk 630 for rotation above optical device 570. In this embodiment, optical device 570 receives pump laser light via optical fiber 505, focuses the pump beam on disk 530 and couples laser light emitted from disk 530 to optical fiber 585, which transmits the laser light to an external device. The operation of optical device 570 will be explained in more detail below, with reference to FIG. 6.

In the embodiment depicted in FIG. 5, optical device 570 is moved in a radial direction by worm gear 580. One of skill in the art will appreciate that any suitable mechanism for radially moving optical device 570 may be used, such as a belt, cable, thread or standard gear.

Optical device 570 and turntable 560 may be moved at a constant or variable speed. In the preferred embodiment, optical device 570 moves with a relatively constant radial speed and turntable 560 rotates disk 630 at a variable speed, depending on the radius of optical device 570, in order to move gain region 415 (shown in FIG. 4) at a roughly constant speed along its spiral path.

In one alternative embodiment, turntable 560 rotates at a constant speed and optical device 570 moves at a variable rate. In another alternative embodiment, optical device 570 is fixed in a single position while disk 630 is both rotated and translated.

In embodiments for use with a disk which is not coated to form an optical resonator, a resonator external to the disk must be provided. In such embodiments, optical device 570 is preferably configured to include one or more mirrors (not shown) to form one portion of this resonator. Another portion of the resonator may be formed in another movable optical device or in a fixed portion of laser apparatus 501. Further, the laser disk is preferably coated with antireflection coatings to minimize optical losses for the input pump and desired output wavelength. An additional bandpass filtering coating can be applied to either side of the laser disk to act as a wavelength selecting element.

Figure 6:
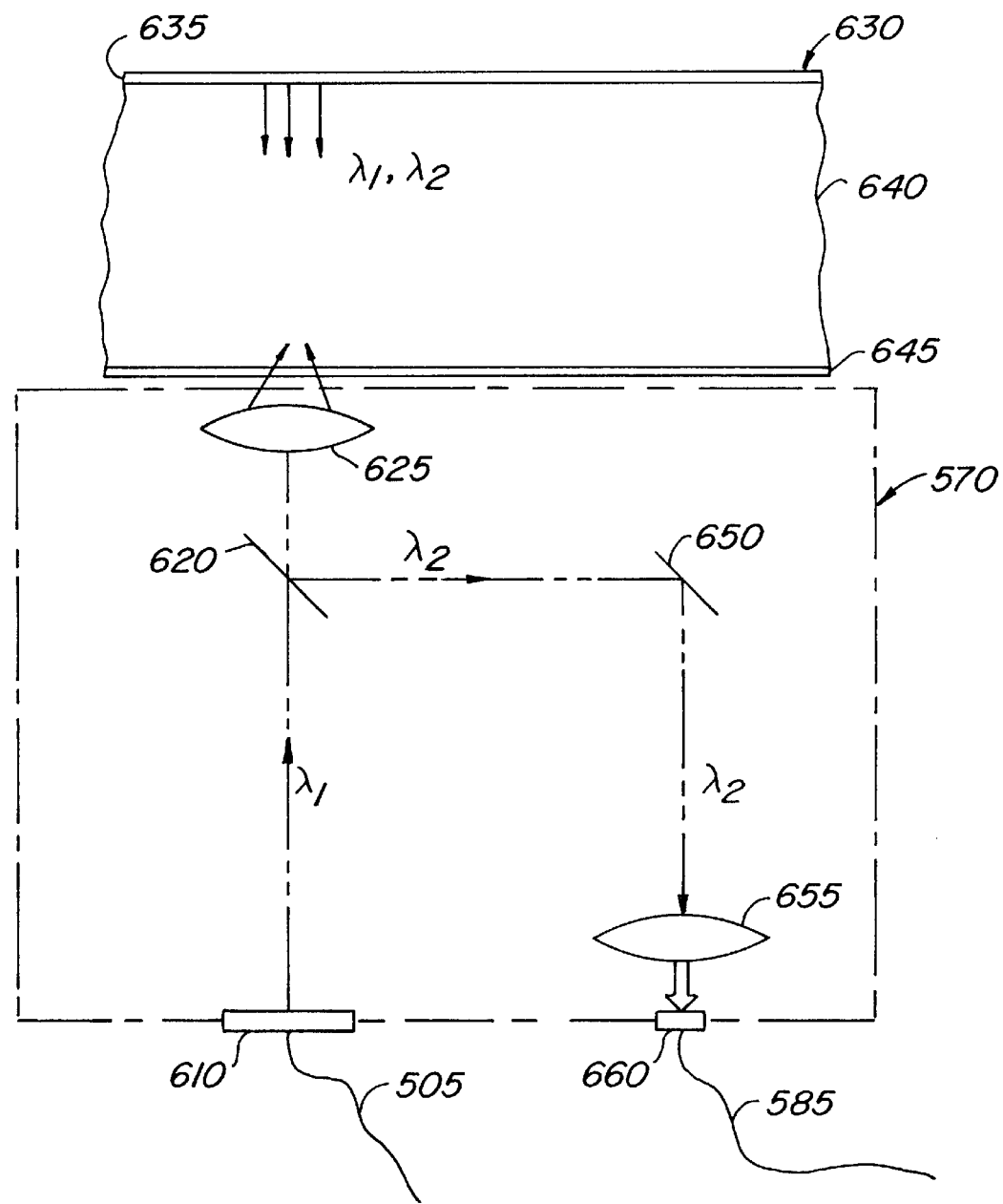
FIG. 6 is a schematic diagram of one embodiment of an optical device and a wavelength conversion device according to the present invention.

FIG. 6 illustrates an embodiment of optical device 570 which includes both input and output coupling capabilities. In this embodiment, optical fiber 505 conveys a pump laser beam with wavelength $\lambda_1$ to optical coupler 610. The pump beam passes through beam splitter 620, which is adapted to reflect a predetermined wavelength (or range of wavelengths). In this embodiment, beam splitter 620 is adapted to pass the pump wavelength $\lambda_1$ and to reflect desired output wavelength $\lambda_2$. Focal mechanism 625 converges the pump beam onto disk 630 (only a portion of which is shown), causing a gain region in medium 640.

In this embodiment, disk 630 includes optical coatings 635 and 645, which form a resonator for medium 640. Coating 645 is substantially transparent to wavelength $\lambda_1$ and partially reflective of desired output wavelength $\lambda_2$. Coating 630 is highly reflective of wavelengths $\lambda_1$ and $\lambda_2$. The output beam, having wavelength $\lambda_2$, reflected by beam splitter 620 to mirror 650 and through output couplers 655 and 660 to output optical fiber 585.

Figure 17:
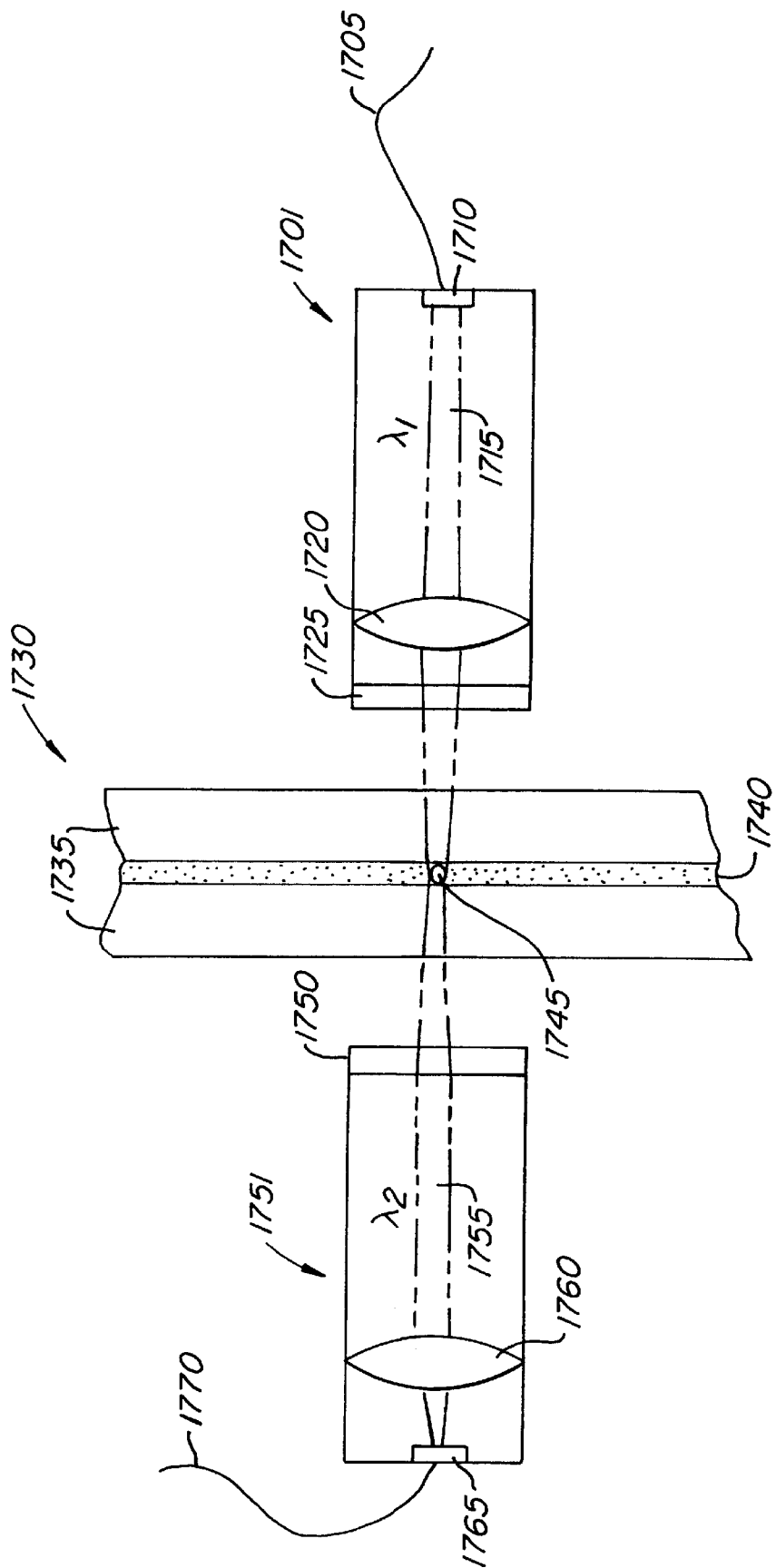
FIG. 17 is a schematic diagram of one embodiment of a laser apparatus which includes separate input coupling and output coupling devices, each of which forms one part of a resonator.

FIG. 17 illustrates an embodiment of laser apparatus 501 in which medium 1730 does not include optical coatings to form a resonator and in which the input and output coupling are performed by separate elements. Here, medium 1730 includes doped region 1740, which is impregnated with laser dye, and undoped regions 1735, which are not impregnated with laser dye. In this embodiment, optical fiber 1705 conveys a pump laser beam with wavelength $\lambda_1$ to optical coupler 1710. Focal mechanism 1720 converges pump beam 1715 onto doped region 1740 of medium 1730, creating gain region 1745.

In this embodiment, optical device 1701 includes mirror 1725 and optical device 1751 includes mirror 1750. Mirrors 1725 and 1750 form a resonator for medium 1730. Mirror 1725 is substantially transparent to wavelength $\lambda_1$ and is reflective of desired output wavelength $\lambda_2$. Mirror 1750 is partially reflective of desired output wavelength $\lambda_2$ and is reflective of wavelength $\lambda_1$. In the preferred embodiment, mirror 1725 is highly reflective of desired output wavelength $\lambda_2$ and mirror 1750 is highly reflective of wavelength $\lambda_1$.

Output beam 1755, having wavelength 2, is converged by focal mechanism 1760 on output coupler 1765, which conveys output beam 1755 to output optical fiber 1770.

It is important that optical devices 1701 and 1751 be kept in proper alignment. Therefore, if optical devices 1701 and 1751 are moved, they must be moved in tandem. Alternatively, in order to more easily preserve the proper alignment, optical devices 1701 and 1751 maybe kept stationary and medium 1730 may be moved. In one such alternative embodiment, medium 1730 is both rotated and translated.

Figure 7:
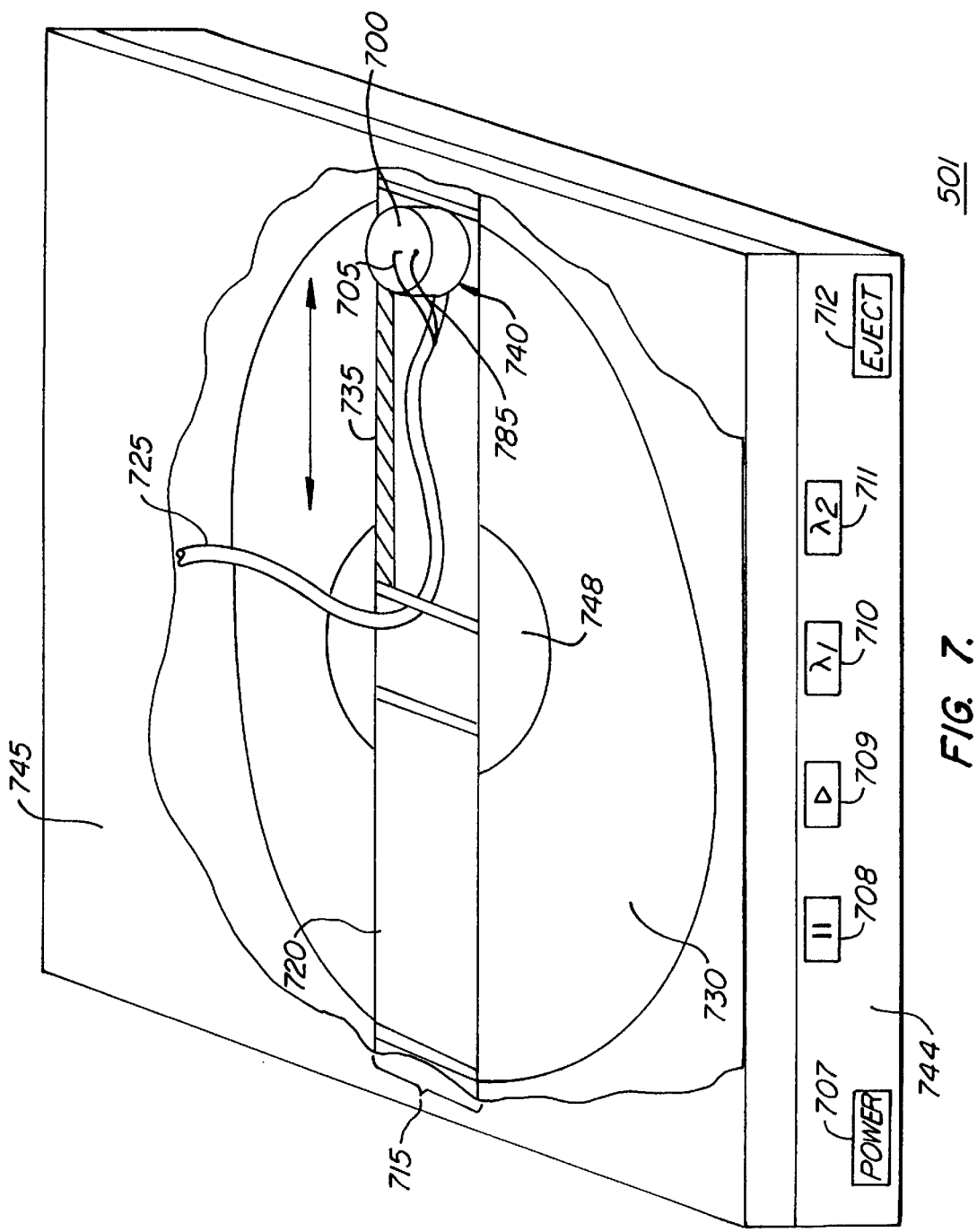
FIG. 7 is a schematic diagram of one embodiment of a laser apparatus according to the present invention.
Figure 8:
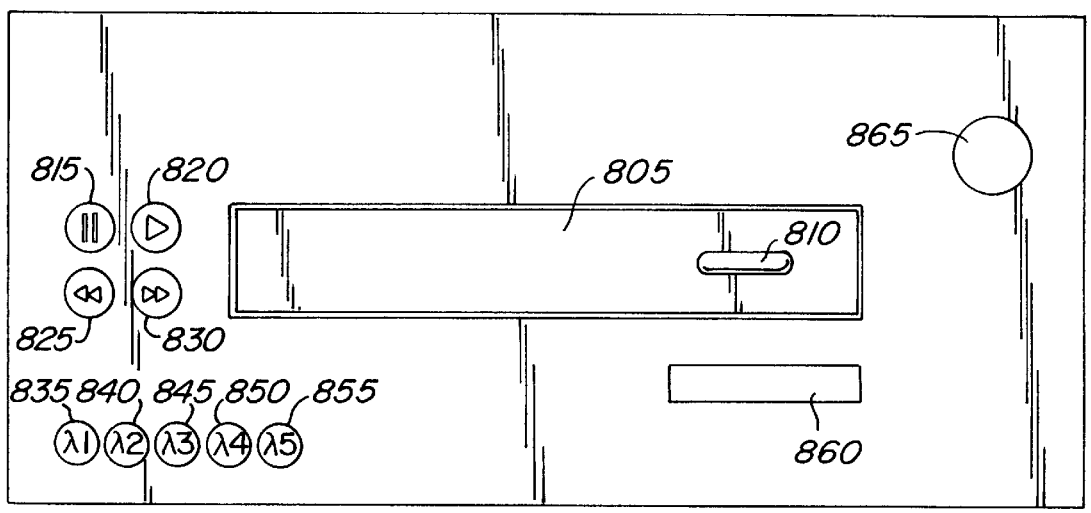
FIG. 8 illustrates the front of a "sliding drawer" embodiment of a laser apparatus according to the present invention.

In the embodiment illustrated in FIG. 7, disk 730 may be inserted into, or removed from, laser apparatus 501 by pressing eject button 712, thereby causing lower portion 744 to slide out (see drawer 810 of FIG. 8). In alternative embodiments, upper portion 745 is a lid and pressing eject button 712 causes the lid to open. Upper portion 745 is shown in a "cutaway" view in order to reveal components which would not otherwise be visible.

Controls 707 through 712, depicted on one side of laser apparatus 501 in this embodiment, are purely representational of the number and type of controls which could be provided. In the embodiment shown on FIG. 7, control 707 is a power button, control 708 is a "pause" button, control 709 is a "lase" button, controls 710 and 711 are wavelength selection buttons and control 712 is an "eject" button. However, any combination of buttons, levers, slider bars, switches, dials or other controls could be used to provide the necessary user interface for laser apparatus 501. Moreover, a graphical user interface could be presented on a screen of laser apparatus 501 or on another device (such as a personal computer) which is configured to control laser apparatus 501.

In the preferred embodiment, disk 730 includes optical coatings deposited directly on at least one side of medium 325, forming at least one portion of an optical resonator. In this embodiment, optical fiber 705 transmits a pump laser beam to optical device 700, which acts as an input coupler similar to focusing mechanism 305, described above with reference to FIG. 3. In the preferred embodiment, optical device 700 also has the function of output coupling device 230, illustrated in FIGS. 2 and 6 and described above. Optical fiber 505 transmits an output laser beam emitted by disk 730 to an external device, such as ophthalmic slit lamp 125.

In embodiments for use with a disk which does not include coatings to form an optical resonator, a resonator external to disk 730 must be provided. In such embodiments, laser apparatus 501 may comprise both optical devices 570 and 700, which may include one or more mirrors (see FIG. 17) to form one part of this resonator. In one embodiment, optical devices 570 and 700 are positioned on opposing sides of disk 730. As described above with reference to FIG. 17, if optical devices 570 and 700 are positioned on opposing sides of disk 730, they may be moved relative to disk 730. Alternatively, disk 730 may be moved relative to optical devices 570 and 700, or both disk 730 and the optical devices may be moved.

In other embodiments, laser apparatus 501 includes either optical device 570 or optical device 700, but not both, and the other half of the resonator is a mirror formed inside laser apparatus 501 on the opposing side of disk 730. If only optical device 570 is present, such a mirror could be, for example, in the form of a reflective strip inside of upper portion 745. In one embodiment, only one side of disk 730 has a reflective coating and either optical device 570 or 700 forms the other side of the resonator. In addition, the laser disk preferably includes antireflection coatings to minimize optical losses for the input pump and desired output wavelength. An additional bandpass coating can be applied to either side of the laser disk to act as a wavelength selecting element.

In the embodiment shown in FIG. 7, optical device 700 is slidably supported by rails 720 of support member 715, which is attached to upper portion 745. In this embodiment, support member 715 includes threaded member 735 which engages with worm wheel 740 to move optical device 700 along rails 720. Motor 702 (here, disposed inside of worm wheel 740) drives optical device 700 along rails 720. In this example, motor 702 moves or stops optical device 700 according to control signals which are generated by processor 1455 when a user operates controls 708 and 709. In this embodiment, motor 702 is attached to optical device 700 and actuates worm wheel 540. However, motor 702 could be disposed in any convenient location, e.g., on support member 715. In this embodiment, cable 725 contains optical fiber 705 and contains wires for supplying power and control signals to motor 702. However, optical fiber 705 need not be included in cable 725. Moreover, one of skill in the art will appreciate that any suitable mechanism for radially moving optical device 700 may be used, such as a belt, cable, thread or standard gear.

Figure 9:
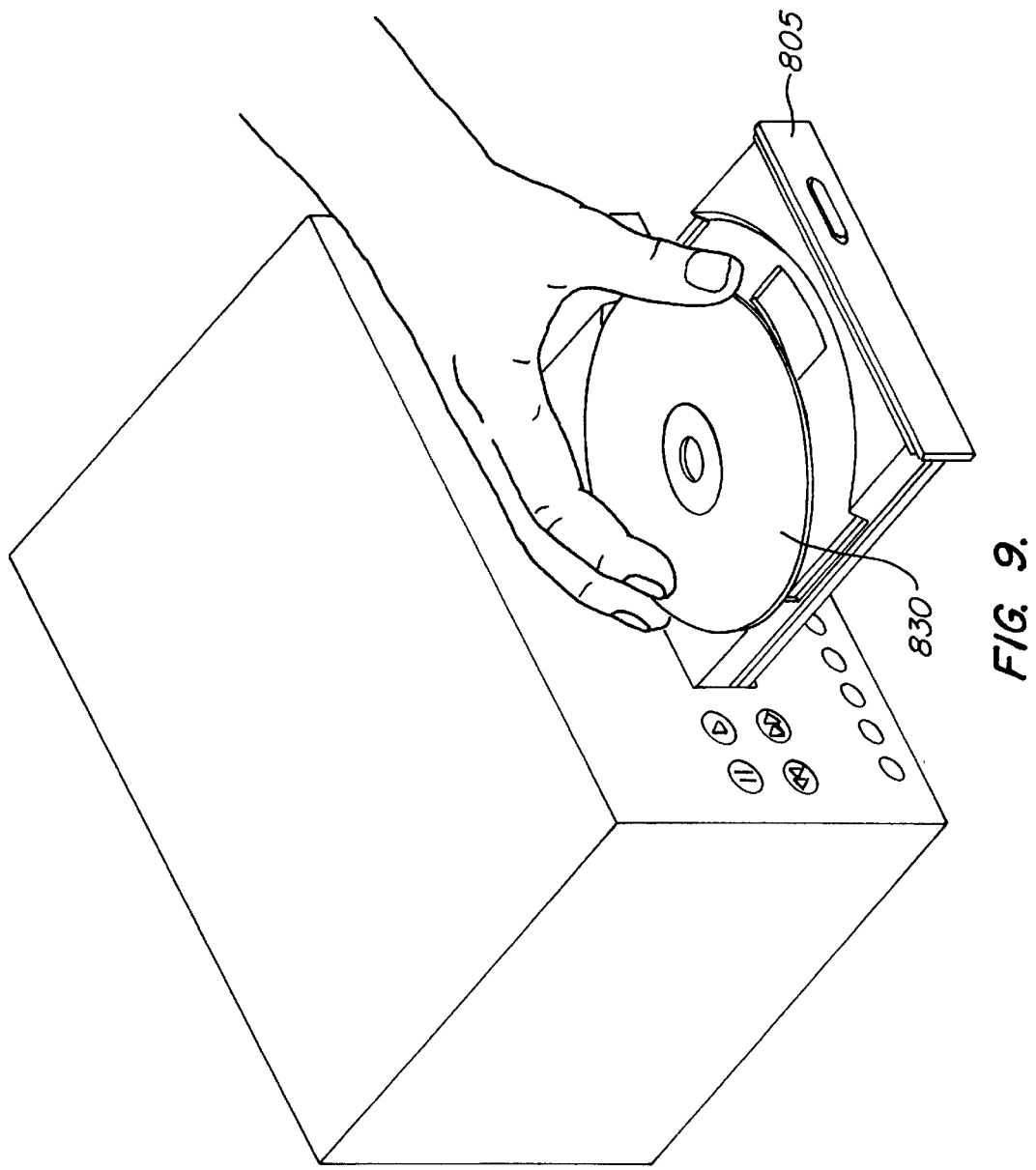
FIG. 9 illustrates how a user may place a disk into a "sliding drawer" embodiment of a laser apparatus according to the present invention.

FIGS. 8 and 9 illustrate a "sliding drawer" embodiment of laser apparatus 501. Instead of having a lid, as shown in FIG. 5B, the embodiment shown in FIGS. 8 and 9 includes drawer 805 which will slide open at a user's command. Such a command may be given by way of software, e.g., from a computer to which laser apparatus 501 is attached, or by operation of a control such as control 810. FIG. 8 illustrates other illustrative controls for laser apparatus 501, including pause button 815, "lase" button 820, seek buttons 825 and 830, frequency control buttons 835, 840, 845, 850 and 855, and power button 865. Window 860 displays the wavelength of the output beam from laser apparatus 501.

FIG. 9 illustrates an open position of drawer 805. When drawer 805 is open, a user may replace disk 830 in the same way that a user of a conventional compact disk player replaces a conventional compact disk.

Figure 10:
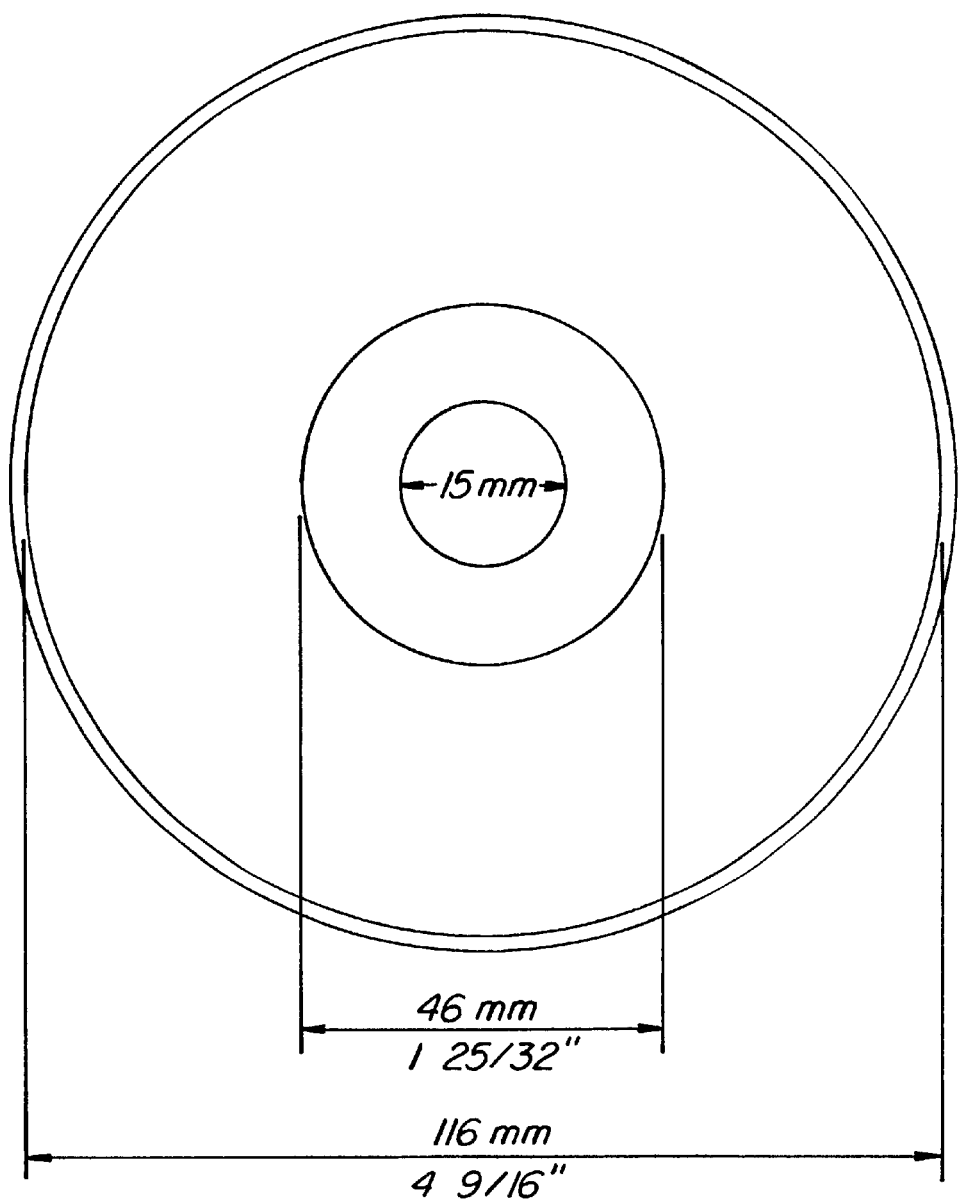
FIG. 10 depicts the standard dimensions of a compact disk.

FIG. 10 illustrates the dimensions of the preferred embodiment of wavelength converter 115, which are the standard dimensions of a compact disk. The outside diameter is 120 mm and the inside diameter (of the hole) is 15 mm. The disk is about 1.2 mm thick. In a standard compact disk, data are recorded from a diameter of 46 mm through a diameter of 116 mm. Although wavelength converter 115 could include a more extensive dye impregnated region, conventional servo motors are designed to illuminate only this range of diameters. Forming wavelength converter 115 into the standard dimensions of a compact disk allows the use of numerous mechanisms used in conventional compact disk players to be used for various embodiments of the present invention.

However, wavelength converter 115 can be formed into any convenient shape. If a rectangular shape is used, optical device 570 is preferably driven by an actuator which sweeps across the medium in the manner of a scanning device.

As noted above, multiple dyes can be doped into the medium of wavelength converter 115, to provide the option of outputting multiple wavelengths from a single medium. For some applications, e.g., illuminating a "cocktail" of more than one PDT drug, it will be desirable to select multiple output wavelengths. For disks which are coated to form a resonator, this selection may be accomplished by forming output optical coating 320 to be partially reflective for more than one desired output wavelength.

Figure 11:
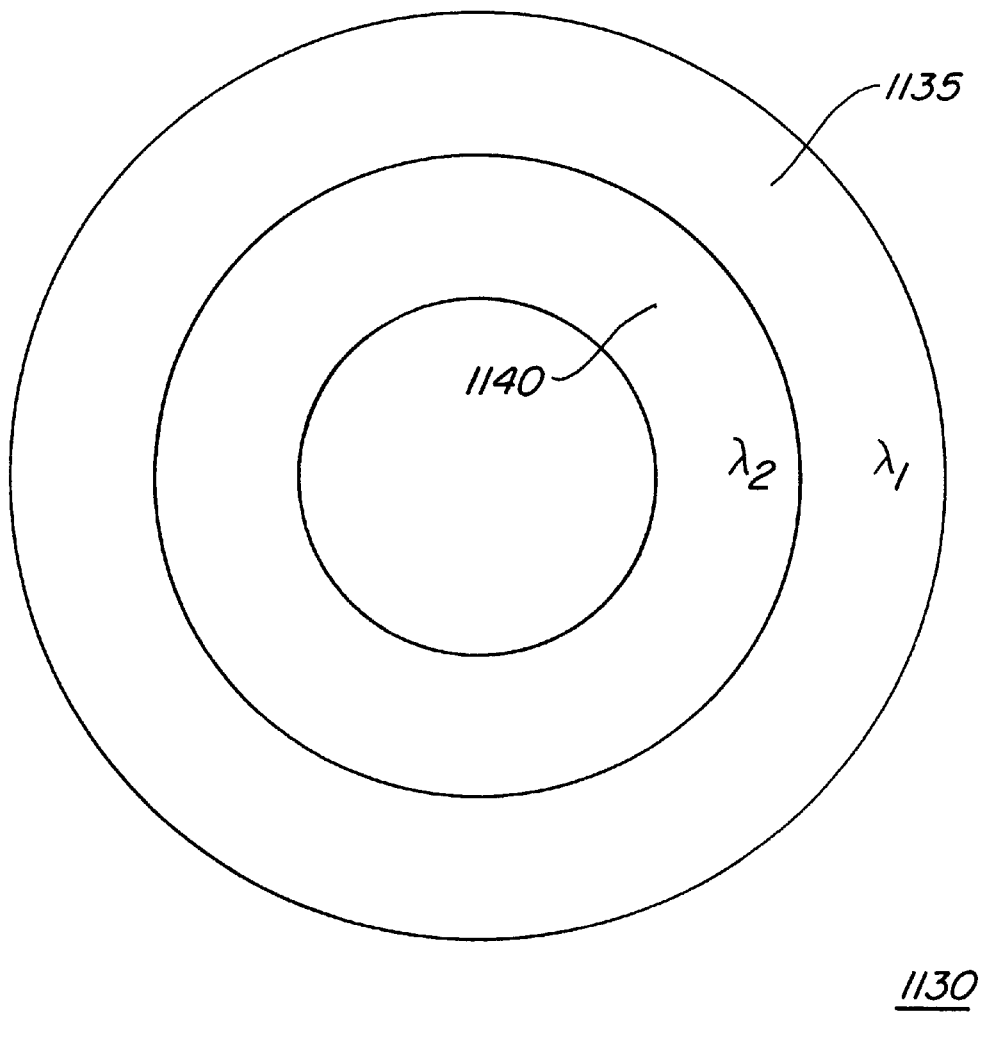
FIG. 11 illustrates one embodiment of a disk with a plurality of optical coatings, wherein each coating passes a different wavelength.

FIG. 11 depicts one exemplary embodiment of disk 1130, which is coated with a plurality of wavelength-selective coatings. Area 1135 of disk 1130 is coated to output a beam of wavelength $\lambda_1$ and area 1140 is coated to output a beam of wavelength $\lambda_2$. Disk 1130 may be used when two or more different output wavelengths are desired, but these different output wavelengths need not be output in rapid succession. Although disk 1130 only outputs beams of two different wavelengths, any desired number of coatings could be used to output any desired number of wavelengths. When using a disk which is coated with a plurality of wavelength-selective coatings, a user may operate controls (such as those shown in FIGS. 7 and 8) to select an output wavelength. In the preferred embodiment, disks which are coated with a plurality of wavelength-selective coatings in the manner of disk 1130 will include a code which indicates the output wavelengths and the locations of the disk which can produce these output frequencies. Laser apparatus 501 will read the code and store the wavelength and location information in a memory. When a user selects an output wavelength, processor 1455 will obtain the wavelength and location information and send a signal to cause an optical device (such as optical device 570) to be positioned over the portion of disk 1130 which can output the selected wavelength.

Figure 12:
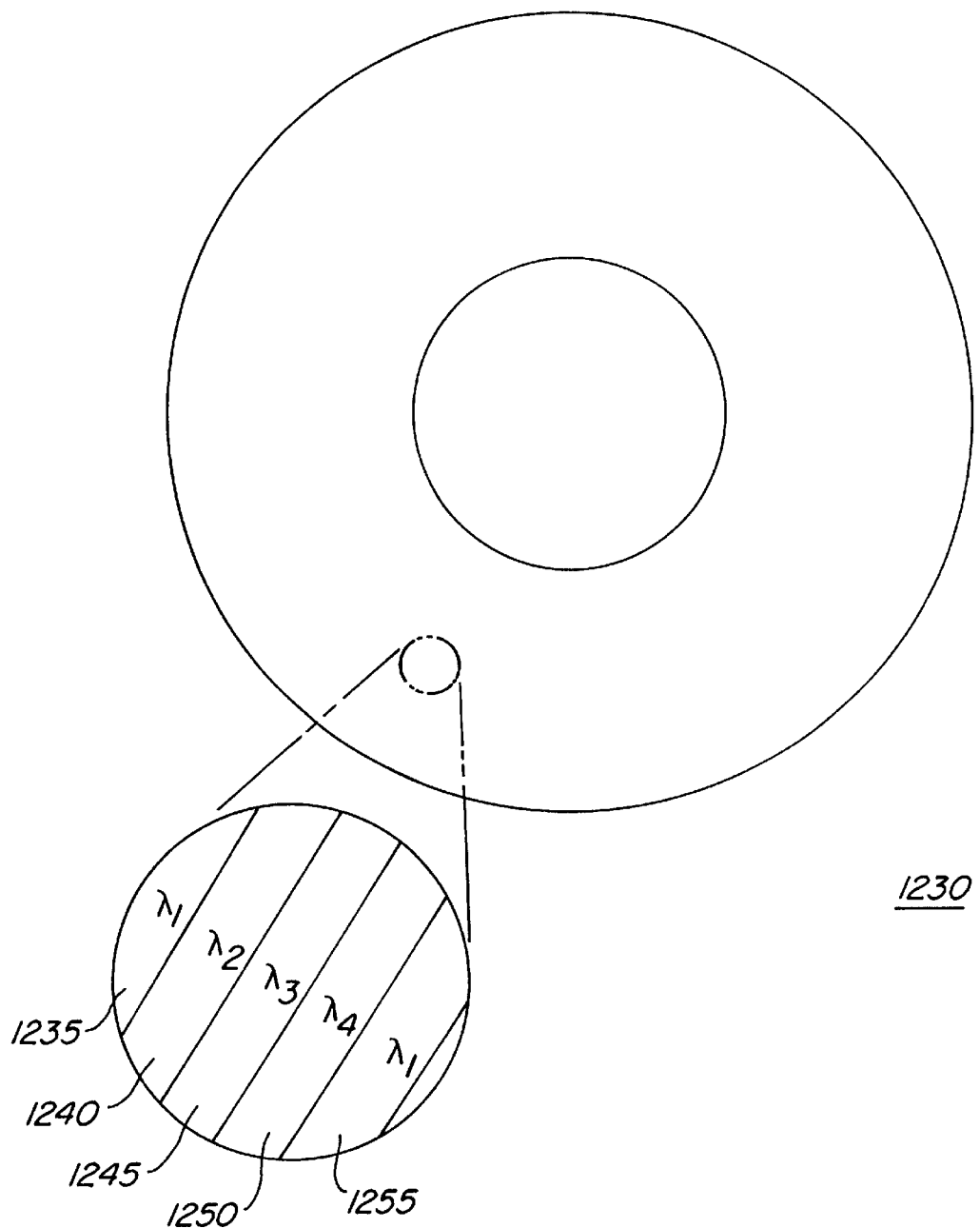
FIG. 12 illustrates a second embodiment of a disk with a plurality of optical coatings, wherein each coating passes a different wavelength.

Referring to FIG. 12, an enlarged portion of disk 1230 is shown, in which four different coatings have been applied to generate output wavelengths $\lambda_1$ through $\lambda_4$. As the gain region of disk 1230 sweeps through regions 1235 to 1255, output wavelengths $\lambda_1$ through $\lambda_4$ may be generated in rapid succession. Although disk 1230 outputs beams of four different wavelengths, any desired number of output wavelengths could be generated in succession.

Figure 13:
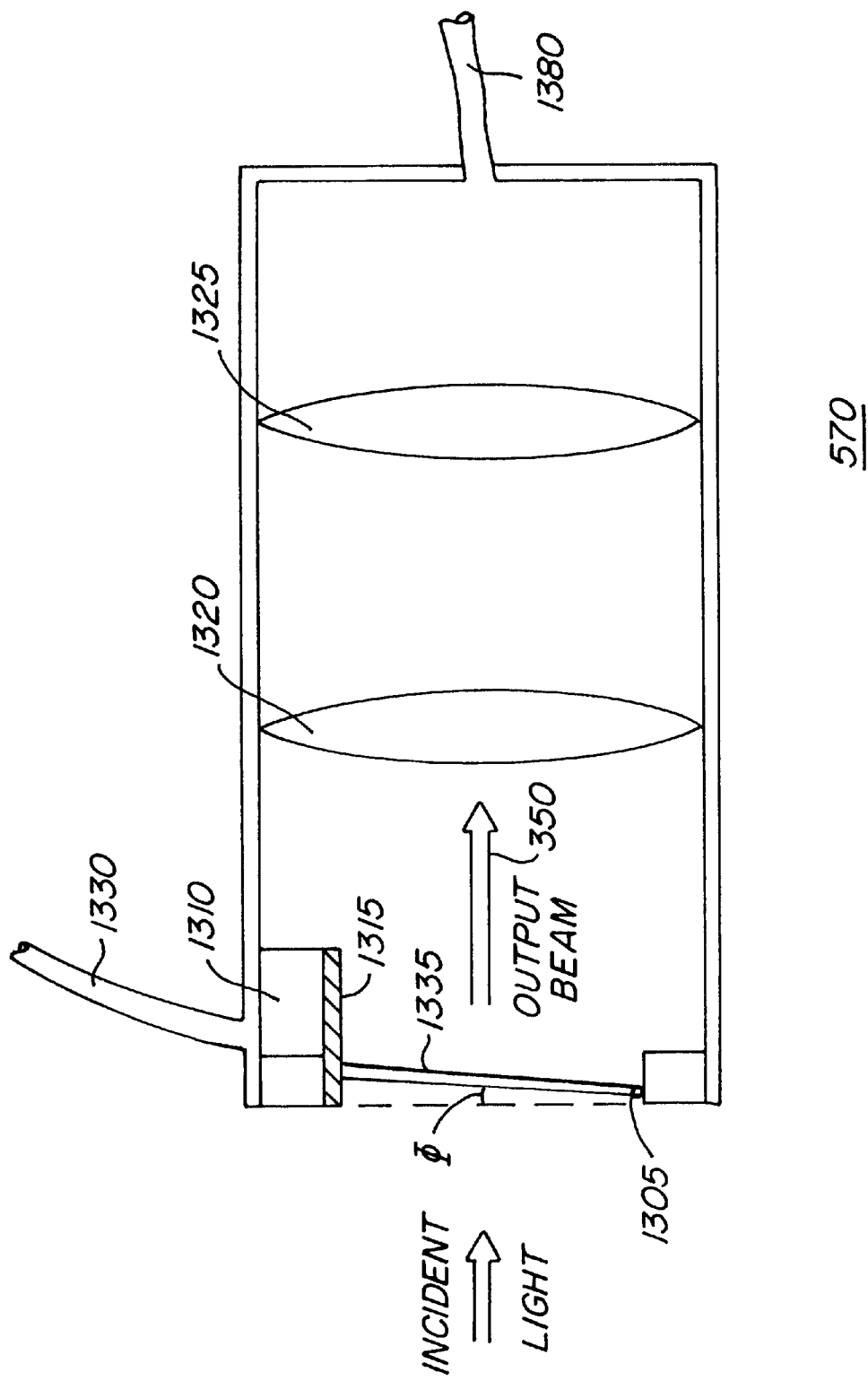
FIG. 13 illustrates one embodiment of a wavelength selection device.

As noted above, a wavelength selection device which includes a dispersion element such as a diffraction grating or prism may be provided, for example, in optical device 570. FIG. 13 is a schematic diagram illustrating one embodiment of such a wavelength selection device which is intended for use with disks not coated to form a resonator on both sides of the disk. FIG. 13 is a cross-section through one embodiment of optical device 570, in which diffraction grating 1335 has replaced a mirror which could otherwise form part of a resonator external to a laser medium. A second mirror is preferably disposed inside of upper portion 745 of laser device 501, or on the distal side of the laser medium. Alternatively, a second mirror may be disposed in optical device 700. In this alternative embodiment, optical device 700 is configured to track the movements of optical device 570. Lenses 1320 and 1325 focus output beam 1350 onto optical fiber 1380.

Diffraction grating 1335 is disposed at angle Φ with respect to the normal of the direction of incident light. Because diffraction grating 1335 reflects a dispersed fan of color, only a small band of wavelengths will be reflected along the axis of incident light. Therefore, each angle Φ corresponds to a narrow band of wavelengths. By rotating diffraction grating 1335 and varying angle Φ, different output wavelengths may be selected. In the embodiment shown in FIG. 13, motor 1310 uses worm gear 1315 to rotate diffraction grating 1335 around pin 1305. However, any convenient method of rotating diffraction grating 1335 could be used, such as a motor-driven belt, cable, thread or standard gear. In addition to using mechanical forces, diffraction grating 1335 could also be moved by applying magnetic or electrostatic forces. Moreover, diffraction grating 1335 need not have one end fixed, but could, for example, be configured to rotate about its midpoint.

In the embodiment depicted in FIG. 13, motor 1310 uses worm gear 1315 to rotate diffraction grating 1335 according to control signals received from a processor via cable 1330. In one embodiment, different desired output wavelengths may be selected by a user using any of controls 835 through 855 shown in FIG. 8, or controls 710 and 711 shown in FIG. 7.

Figure 14:
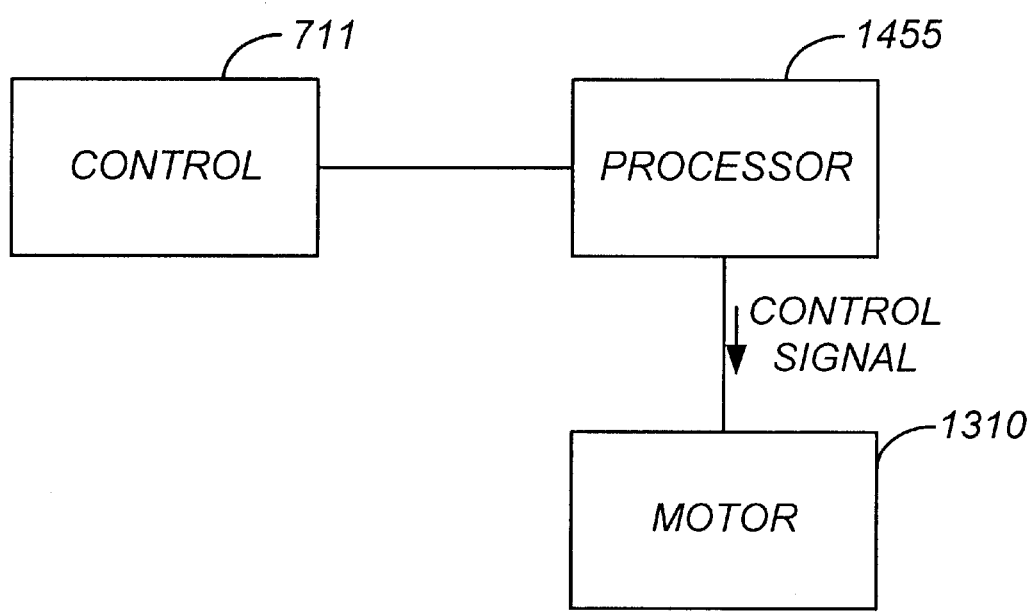
FIG. 14 is a block diagram indicating one embodiment of a control mechanism for a wavelength selection device.

Referring to the block diagram of FIG. 14, a user activates control 711 of laser apparatus 501 to select a desired output wavelength. Control 711 sends a control signal to processor 1455, which determines an appropriate angle Φ of diffraction grating 1335 which corresponds with the desired wavelength and determines the distance worm gear 1315 must travel to form angle Φ. Processor 1455 may determine angle Φ by reference to a look-up table, by calculation, by receiving data encoded on the disk, or by any other convenient fashion. After processor 1455 determines the appropriate angle Φ, processor 1455 transmits a control signal to motor 1310, indicating the distance worm gear 1315 must travel to form angle Φ.

Figure 15:
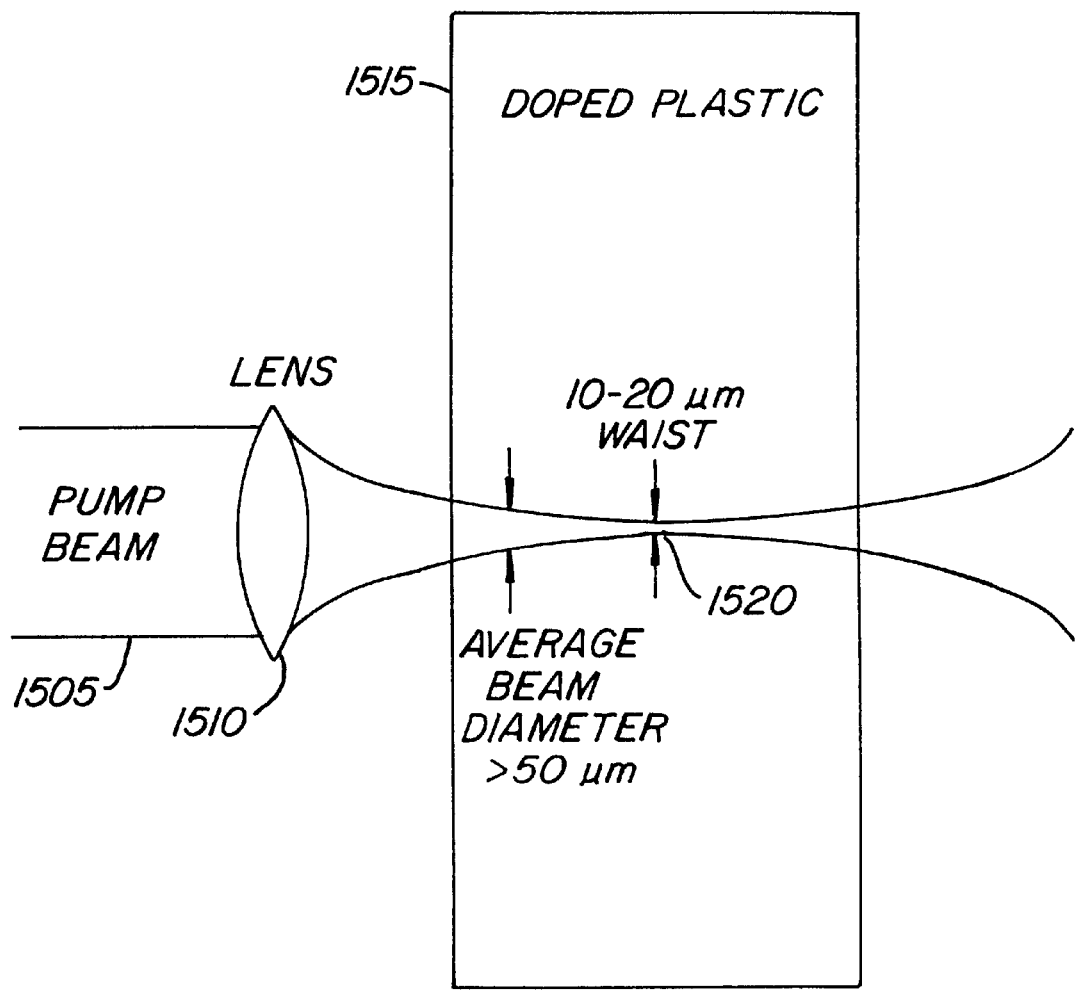
FIG. 15 is a schematic diagram of a wavelength conversion device in which most of a plastic medium has been doped with laser dye.
Figure 16:
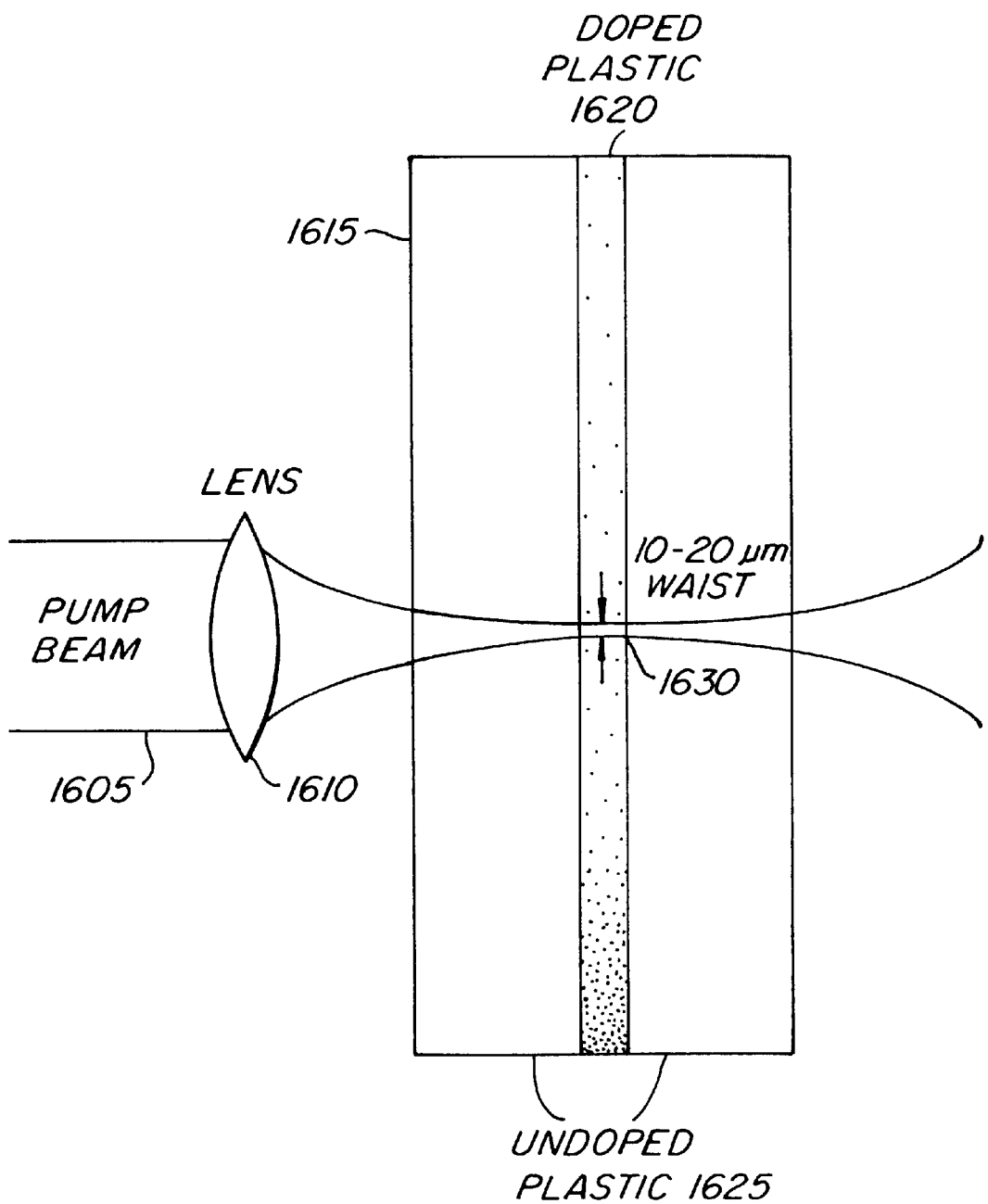
FIG. 16 is a schematic diagram of a wavelength conversion device in which a plastic medium includes a doped layer situated between two undoped layers.

FIGS. 15 and 16 illustrate why it is sometimes advantageous to impregnate only a portion of the medium's thickness with laser dye. The dimensions and other particulars of FIGS. 15 and 16 are purely illustrative.

FIG. 15 depicts pump beam 1505 converged by lens 1510 to excite doped gain medium 1515. If pump beam 1505 is of sufficiently high quality, it may be advantageous for the entire thickness of gain medium 1515 to be doped. However, as depicted in FIG. 15, pump beam 1505 must generally be focused to small waist 1520 to achieve a high enough intensity to provide adequate gain. For practical applications, input beam 1505 often comes from a multimode optical fiber or is otherwise of low quality (high order transverse mode). In such circumstances, it is necessary to use low f-number optics to achieve small waist 1520. The beam diameter will be small only over a short region near the waist, and over much of plastic gain medium 1515, the beam diameter will be substantially larger. Consequently, much of the power of pump beam 1505 will be absorbed in regions of low pump intensity, generating relatively low gain.

FIG. 16 illustrates a preferred embodiment for instances when the quality of the pump beam is relatively low. Here, pump beam 1605 is converged by lens 1610 to doped layer 1620 of gain medium 1615. In this example, doped layer 1620 is disposed between undoped layers 1625. However, doped layer 1620 could be located in any convenient portion of gain medium 1615. For example, doped layer 1620 may advantageously be disposed on one side of gain medium 1615. By concentrating the dye dopant into a layer of the medium, it is possible to attain a small average spot size in doped layer 1620. This means that pump beam 1605 is only absorbed in regions of high pump intensity, such as waist 1630.

Doped layer 1620 will have high gain and be capable of efficient extraction if its thickness is chosen to match the characteristics of pump beam 1605 and the concentration of laser dye in doped layer 1620. If doped layer 1620 is too thin, it may have insufficient laser dye, or it may overheat and cause thermal lensing or burning. If doped layer 1620 is too thick, much of the power of pump beam 1605 will be absorbed in regions of low pump intensity, generating relatively low gain. In a device having optics as described with reference to FIG. 15, doped layer 1620 is preferably in the range of 50 to 200 microns, with an optimal thickness of approximately 100 microns. If the medium has the dimensions of a compact disk, the overall thickness is 1200 microns; hence, the doped layer would occupy about 1/24 to 1/6 of the disk.

While the best mode for practicing the invention has been described in detail, those of skill in the art will recognize that there are numerous alternative designs, embodiments, modifications and applied examples which are within the scope of the present invention. Accordingly, the scope of this invention is not limited to the previously described embodiments.

What is claimed is:

1. A medium for converting a pump wavelength of a pump laser to at least one desired output wavelength different from the pump wavelength, the medium comprising:
    a doped layer which is impregnated with at least one type of laser dye;
    a first undoped layer which is not impregnated with laser dye;
    a second undoped layer which is not impregnated with laser dye;
    an input optical coating disposed on a surface of the first undoped layer; and
    an output optical coating disposed on a surface of the second undoped layer, wherein:
        the input optical coating and the output optical coating are configured to form an optical resonator within the medium; and
        the output optical coating is partially reflective at a desired output wavelength and highly reflective at the pump wavelength; and
    encoding means for encoding said at least one desired output wavelength onto said medium.

2. The medium of claim 1, wherein the medium has dimensions which approximate those of a compact disk.

3. The medium of claim 1, wherein the doped layer is impregnated with a plurality of laser dyes.

4. A medium for converting a pump wavelength of a pump laser to at least one desired output wavelength different from the pump wavelength, the medium comprising:
    a doped layer which is impregnated with at least one type of laser dye;
    an undoped layer which is not impregnated with laser dye;
    a first optical coating disposed on a surface of the undoped layer; and
    a second optical coating disposed on a surface of the doped layer, wherein the first optical coating and the second optical coating are configured to form an optical resonator within the medium; and
    encoding means for encoding said at least one desired output wavelength onto said medium.

5. The medium of claim 4, wherein the medium has dimensions which approximate those of a compact disk.

6. The medium of claim 4, wherein the doped layer is impregnated with a plurality of laser dyes.

7. The medium of claim 4, wherein the first optical coating is an output optical coating which is partially reflective at a desired output wavelength and highly reflective at the pump wavelength.

8. The medium of claim 4, wherein the second optical coating is an output optical coating which is partially reflective at a desired output wavelength and highly reflective at the pump wavelength.

9. A medium for converting a pump wavelength of a pump laser to at least one desired output wavelength different from the pump wavelength, the medium comprising:
    a doped layer which is impregnated with at least one type of laser dye; and
    an undoped layer which is not impregnated with laser dye; and
    encoding means for encoding said at least one output wavelength, wherein an outside surface of the doped layer comprises a first surface of the medium and an outside surface of the undoped layer comprises a second surface of the medium.

10. The medium of claim 9, wherein the medium has dimensions which approximate those of a compact disk.

11. The medium of claim 9, wherein:
    the doped layer is impregnated with a plurality of laser dyes; and
    the encoding means encodes a plurality of output wavelengths.

12. The medium of claim 9, further comprising an optical coating on the doped layer, wherein the output optical coating is highly reflective at a desired output wavelength and highly reflective at the pump wavelength.

13. The medium of claim 9, further comprising an optical coating on the undoped layer, wherein the output optical coating is highly reflective at a desired output wavelength and highly reflective at the pump wavelength.

14. The medium of claim 9, wherein the encoding means is selected from the group consisting of pits and lands formed on the medium, a bar code and a magnetic strip.

15. A medium for converting a pump wavelength of a pump laser to at least one desired output wavelength different from the pump wavelength, the medium comprising:
    a doped layer which is impregnated with at least one type of laser dye; and
    an undoped layer which is not impregnated with laser dye; and encoding means for encoding said at least one output wavelength.

16. The medium of claim 15, wherein the medium has dimensions which approximate those of a compact disk.

17. The medium of claim 15, wherein:
the doped layer is impregnated with a plurality of laser dyes; and
the endoding means encodes a plurality of output wavelengths.

18. The medium of claim 15, further comprising an optical coating on the undoped layer, wherein the output optical coating is highly reflective at a desired output wavelength and highly reflective at the pump wavelength.

19. A medium for converting a pump wavelength of a pump laser beam to a plurality of desired output wavelengths different from the pump wavelength, the apparatus comprising:
a solid medium impregnated with a plurality of laser dyes;
an input optical coating disposed on a first surface of the medium;
a first output optical coating disposed on a first area of a second surface of the medium; and
a second output optical coating disposed on a second area of the second surface of the medium; wherein:
the input optical coating and the output optical coatings are configured to form an optical resonator within the medium;
the first output optical coating is partially reflective at a desired first output wavelength and highly reflective at the pump wavelength; and
the second output optical coating is partially reflective at a desired second output wavelength and highly reflective at the pump wavelength; and
encoding means for encoding said at least one desired output wavelength onto said medium.

20. The medium of claim 19, wherein the medium has dimensions which approximate those of a compact disk.

21. The medium of claim 19, further comprising encoding means for encoding the first and second output wavelengths.

22. An apparatus for converting a pump wavelength of a pump laser beam to a desired output wavelength, comprising:
rotating means for rotating a disk-shaped solid medium impregnated with at least one type of laser dye;
first optical coupling means for coupling a pump laser beam having a pump wavelength to the medium; and
second optical coupling means for coupling a laser beam output from a pumped volume of the medium to an output device, wherein:
the output laser beam has a wavelength different from the pump frequency; and
the rotating means rotates the medium at a rate fast enough to clear a volume of the medium pumped by the pump laser beam in about 1 $\mu$sec; and
radial moving means coupled to said first and second optical coupling means, wherein said radial moving means operates in conjunction with said rotating means to cause said pumped volume to form a spiral pattern within said medium during apparatus operation.

23. The apparatus of claim 22, further comprising resonator means disposed in the first optical coupling means.

24. The appartus of claim 22, further comprising resonator means disposed in the second optical coupling means.

25. The apparatur of claim 22, wherein the medium has dimensions which approximate those of a compact disk.

26. The apparatus of claim 22, further comprising means for loading and ejecting the medium.

27. The apparatus of claim 22, further comprising wavelength selection means for selecting one of a plurality of output wavelengths.

28. The apparatus of claim 22, wherein the rotating means rotates the medium such that a pumped volume moves at a linear speed in range of 10 to 20 meters per second.

29. The apparatus of claim 22, wherein the second optical coupling means tracks the movement of the pumped volume.

30. The apparatus of claim 22, wherein the second optical coupling means moves in the same radial direction as the first optical coupling means, such that the first optical coupling means and the second optical coupling means are on opposite sides of the pumped volume of the medium.

31. The apparatus of claim 22, wherein the first and second optical coupling means are disposed a same side of the medium.

32. The apparatus of claim 22, further comprising disk translation means, wherein the first and second optical coupling means remain stationary and the medium is both rotated and translated.

* * * * *